United States Patent
Luo et al.

(10) Patent No.: US 7,116,820 B2
(45) Date of Patent: Oct. 3, 2006

(54) DETECTING AND CORRECTING RED-EYE IN A DIGITAL IMAGE

(75) Inventors: Huitao Luo, Sunnyvale, CA (US); Jonathan Yen, San Jose, CA (US); Daniel Tretter, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 344 days.

(21) Appl. No.: 10/424,419

(22) Filed: Apr. 28, 2003

(65) Prior Publication Data

US 2004/0213476 A1  Oct. 28, 2004

(51) Int. Cl.
G06K 9/00 (2006.01)
G06K 9/40 (2006.01)

(52) U.S. Cl. .................. 382/167; 382/117; 382/275

(58) Field of Classification Search ............... 382/167, 382/117, 275
See application file for complete search history.

(56) References Cited

U.S. PATENT DOCUMENTS

| | | | |
|---|---|---|---|
| 5,432,863 A * | 7/1995 | Benati et al. ............... | 382/167 |
| 6,009,209 A * | 12/1999 | Acker et al. ................ | 382/275 |
| 6,016,354 A * | 1/2000 | Lin et al. .................... | 382/117 |
| 6,252,976 B1 | 6/2001 | Schildkraut et al. ........ | 382/117 |
| 6,292,574 B1 | 9/2001 | Schildkraut et al. ........ | 382/117 |
| 6,307,954 B1 * | 10/2001 | Suzaki ........................ | 382/117 |
| 6,728,401 B1 * | 4/2004 | Hardeberg ................... | 382/167 |
| 6,873,743 B1 * | 3/2005 | Steinberg .................... | 382/275 |
| 2002/0136450 A1 * | 9/2002 | Chen et al. .................. | 382/165 |
| 2002/0176623 A1 | 11/2002 | Steinberg .................... | 382/165 |
| 2003/0007687 A1 * | 1/2003 | Nesterov et al. ............ | 382/167 |
| 2003/0044042 A1 * | 3/2003 | King et al. .................. | 382/100 |
| 2003/0202105 A1 * | 10/2003 | Gaubatz et al. ........ | 348/207.99 |
| 2004/0184670 A1 * | 9/2004 | Jarman et al. .............. | 382/274 |

FOREIGN PATENT DOCUMENTS

| | | | |
|---|---|---|---|
| EP | 0884694 | | 12/1998 |
| WO | WO99/17254 | * | 4/1999 |
| WO | WO0171421 | | 9/2001 |

OTHER PUBLICATIONS

"Industry's first completely automatic red eye detection and reduction system launched," Pictos Technologies, Inc. (Apr. 2002).

(Continued)

Primary Examiner—Wenpeng Chen

(57) ABSTRACT

A preliminary set of candidate red-eye pixel areas is identified based on computed pixel redness measures. Candidate red-eye pixel areas having computed redness contrasts relative to respective neighboring pixel areas less than a prescribed redness contrast threshold are filtered from the preliminary set. Candidate red-eye pixel areas located in areas of the digital image having computed grayscale contrasts relative to respective neighboring pixel areas less than a prescribed grayscale contrast threshold also are filtered from the preliminary set. In another aspect, a final pixel mask identifying red-eye pixels and non-red-eye pixels in the candidate red-eye area is generated. Pixels in the candidate red-eye pixel area identified as red-eye pixels in the final pixel mask are desaturated from their original color values by respective scaling factors that vary depending on luminance of the pixels in the candidate red-eye pixel area and proximity of the pixels to boundaries between red-eye pixels and non-red-eye pixels.

60 Claims, 8 Drawing Sheets

OTHER PUBLICATIONS

"Red-Eye Removal," Pixology—Product Categories, (before Apr. 2003).

M. Gaubatz and R. Ulichney, "Automatic red-eye detection and correction," ICIP, New York, 2002.

R-L Hsu, M. Abdel-Mottaleb and A.K. Jain, "Face Detection in Color Images," ICIP, Thessaloniki, 2001.

"Better Pictures, More Choice," Eastman Kodak Company, (Feb. 5, 2002).

* cited by examiner

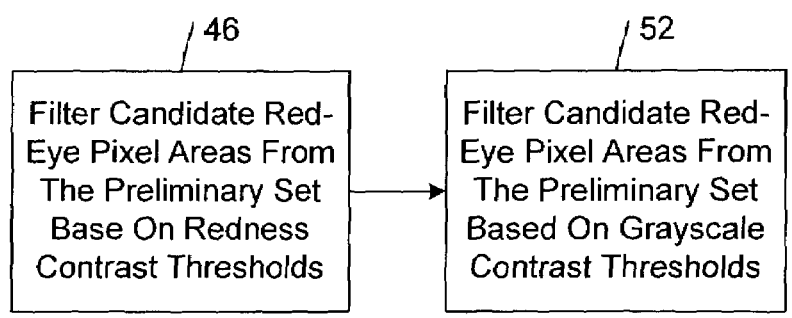
FIG. 7
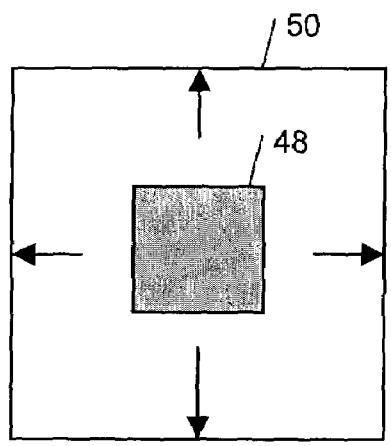
FIG. 8A
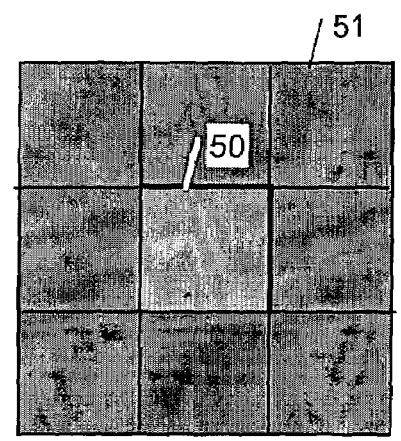
FIG. 8B
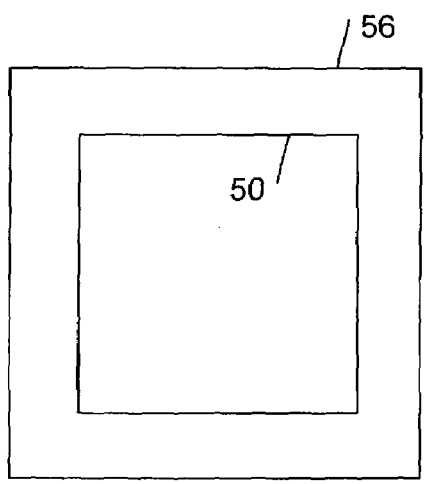
FIG. 9A
| 3 | 2 | 1 |
|---|---|---|
| 4 | 8 | 0 |
| 5 | 6 | 7 |
FIG. 9B

DETECTING AND CORRECTING RED-EYE IN A DIGITAL IMAGE

TECHNICAL FIELD

This invention relates to systems and methods of detecting and correcting red-eye in a digital image.

BACKGROUND

Red-eye is the appearance of an unnatural reddish coloration of the pupils of a person appearing in an image captured by a camera with flash illumination. Red-eye is caused by light from the flash reflecting off blood vessels in the person's retina and returning to the camera.

Several techniques have been proposed to reduce the red-eye effect. A common red-eye reduction solution for cameras with a small lens-to-flash distance is to use one or more pre-exposure flashes before a final flash is used to expose and capture an image. Each pre-exposure flash tends to reduce the size of a person's pupils and, therefore, reduce the likelihood that light from the final flash will reflect from the person's retina and be captured by the camera. In general, pre-exposure flash techniques typically only will reduce, but not eliminate, red-eye.

A large number of image processing techniques have been proposed to detect and correct red-eye in color images. In general, these techniques typically are semi-automatic or automatic. Semi-automatic red-eye detection techniques rely on human input. For example, in some semi-automatic red-eye reduction systems, a user must manually identify to the system the areas of an image containing red-eye before the defects can be corrected. Many automatic red-eye reduction systems rely on a preliminary face detection step before red-eye areas are detected. A common automatic approach involves detecting faces in an image and, subsequently, detecting eyes within each detected face. After the eyes are located, red-eye is identified based on shape, coloration, and brightness of image areas corresponding to the detected eye locations. In general, face-detection-based automatic red-eye reduction techniques are computation and memory intensive. In addition, most of the face detection algorithms are only able to detect faces that are oriented in an upright frontal view; these approaches cannot detect faces that are rotated in-plane or out-of-plane with respect to the image plane.

SUMMARY

The invention features systems and methods of detecting and correcting red-eye in a digital image.

In one aspect, the invention features a scheme (systems and methods) for processing a digital image. In accordance with this inventive scheme, measures of pixel redness in the digital image are computed. A preliminary set of candidate red-eye pixel areas is identified based on the computed pixel redness measures. Each candidate red-eye pixel area having a computed redness contrast relative to at least one respective neighboring pixel area less than a prescribed redness contrast threshold is filtered from the preliminary set. In addition, each candidate red-eye pixel area located in an area of the digital image having a computed grayscale contrast relative to at least one respective neighboring pixel area less than a prescribed grayscale contrast threshold is filtered from the preliminary set.

In another aspect, the invention features a scheme (systems and methods) for processing a digital image containing pixels with original color values. In accordance with this inventive scheme, at least one candidate red-eye pixel area in the digital image is detected. Pixels in each candidate red-eye pixel area are classified based on redness and skin tone coloration. For each candidate red-eye pixel area, an initial pixel mask identifying all pixels in the candidate red-eye pixel area classified as red and non-skin tone is generated. A final pixel mask is generated based on each initial pixel mask. Red-eye in the digital image is corrected by darkening and desaturating original color values identified as red in the final pixel mask, wherein original color values of pixels identified as red in the final pixel mask are desaturated by respective amounts that vary with pixel location in the final pixel mask.

Other features and advantages of the invention will become apparent from the following description, including the drawings and the claims.

DESCRIPTION OF DRAWINGS

FIG. 7 is a flow diagram of filtering steps in an embodiment of a process of detecting red-eye in a digital image.

FIG. 8A is a diagrammatic view of a candidate red-eye pixel area being enlarged.

FIG. 8B is a diagrammatic view of the enlarged candidate red-eye pixel area of FIG. 8A surrounded by a set of eight neighboring pixel areas.

FIG. 9A is diagrammatic view of a candidate red-eye pixel area surrounded by a candidate grayscale eyeball pixel area.

FIG. 9B is a diagrammatic view of a candidate grayscale eyeball pixel area surrounded by a set of eight neighboring pixel areas.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. System Overview

Figure 1:
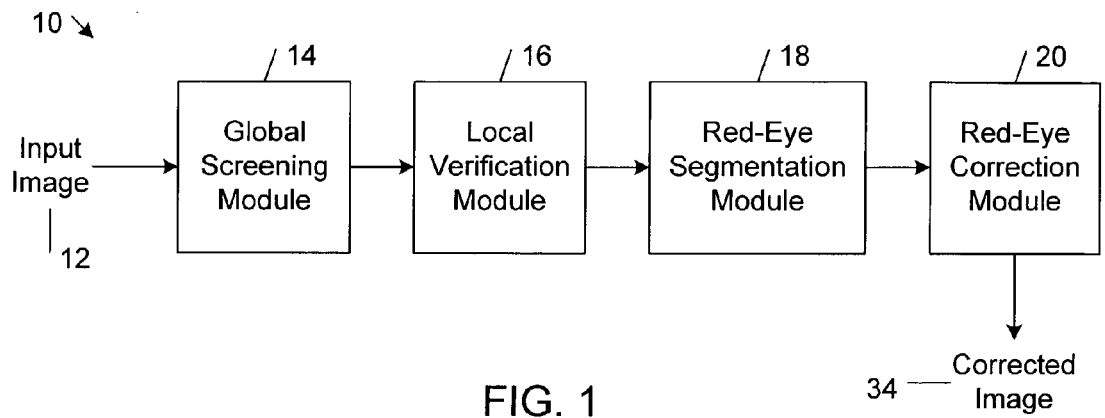
FIG. 1 is a block diagram of an embodiment of a system for detecting and correcting red-eye in a digital image.
Figure 2:
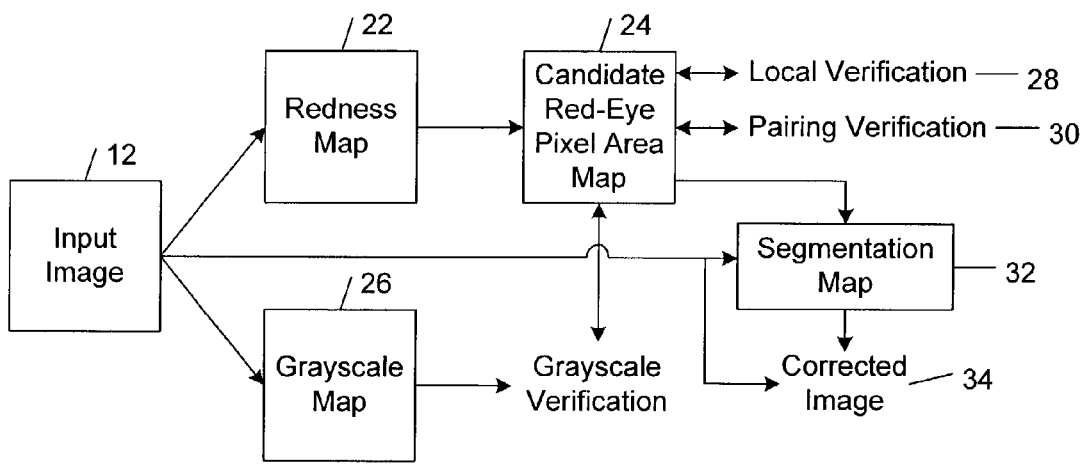
FIG. 2 is an information flow diagram of different image maps derived from an input image and different processing steps applied to the image maps in an embodiment of a process of detecting and correcting red-eye in a digital image.

Referring to FIGS. 1 and 2, in one embodiment, a system 10 for detecting and correcting red-eye pixel areas in a digital input image 12 includes a global screening module 14, a local verification module 16, a red-eye segmentation module 18, and a red-eye correction module 20. Global screening module 14 computes a redness map 22 based on the input image 12 and filters the redness map 22 to generate candidate red-eye pixel area map 24. In addition, global screening module 14 computes a grayscale map 26 and filters from the candidate red-eye pixel area map 24 each candidate red-eye pixel area located in an area of the digital image having a computed grayscale contrast relative to at least one respective neighboring pixel area that is less than a prescribed grayscale contrast threshold. Local verification module 16 filters the candidate red-eye pixels areas in the filtered candidate red-eye pixel area map 24 based on one or more local verification tests 28 and a pairing verification test 30. Red-eye segmentation module 18 processes each of the remaining candidate red-eye pixel areas to generate a segmentation map 32, which specifies the pixels in the red-eye pixel areas of candidate red-eye pixel area map 24 that correspond to red-eye pixels in the input image 12. Red-eye correction module 20 corrects the input image pixels corresponding to the segmented red-eye pixels in the segmentation map 32 (e.g., by desaturation or a combination of desaturation and darkening) to generate a corrected image 34.

In some embodiments, the modules 14–20 of system 10 are implemented as one or more respective software modules that are executable on a computer (or workstation). In general, a computer (or workstation) on which modules 14–20 of system 10 may execute includes a processing unit, a system memory, and a system bus that couples the processing unit to the various components of the computer. The processing unit may include one or more processors, each of which may be in the form of any one of various commercially available processors. The system memory typically includes a read only memory (ROM) that stores a basic input/output system (BIOS) that contains start-up routines for the computer, and a random access memory (RAM). The system bus may be a memory bus, a peripheral bus or a local bus, and may be compatible with any of a variety of bus protocols, including PCI, VESA, Microchannel, ISA, and EISA. The computer also may include a hard drive, a floppy drive, and CD ROM drive that are connected to the system bus by respective interfaces. The hard drive, floppy drive, and CD ROM drive contain respective computer-readable media disks that provide non-volatile or persistent storage for data, data structures and computer-executable instructions. Other computer-readable storage devices (e.g., magnetic tape drives, flash memory devices, and digital video disks) also may be used with the computer. A user may interact (e.g., enter commands or data) with the computer using a keyboard and a mouse. Other input devices (e.g., a microphone, joystick, or touch pad) also may be provided. Information may be displayed to the user on a monitor or with other display technologies. The computer also may include peripheral output devices, such as speakers and a printer. In addition, one or more remote computers may be connected to the computer over a local area network (LAN) or a wide area network (WAN) (e.g., the Internet).

II. Global Screening Module

Global Candidate Red-Eye Pixel Area Detection

Figure 3:
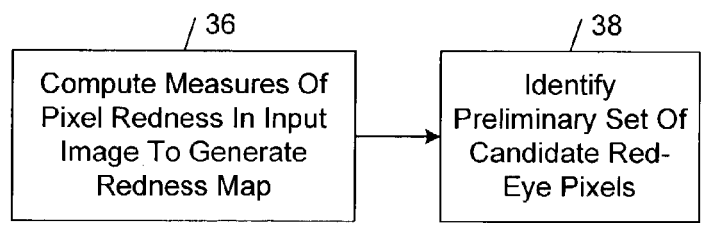
FIG. 3 is a flow diagram of steps in an embodiment of a process of detecting red-eye in a digital image.
Figure 4A:
FIG. 4A is an exemplary input image.
Figure 4B:
FIG. 4B is a redness map derived from the input image of FIG. 4A.

Referring to FIG. 3, in operation, global screening module 14 initially computes measures of pixel redness in the input image 12 to generate redness map 22 (step 36). Any one of a variety of different measures of pixel redness may be used to generate redness map 22 from input image 12. In some embodiments, the pixel redness measures are computed based on a ratio of a measure of a red component of pixel energy to a measure of total pixel energy. For example, in one implementation, pixel redness measures (R) are computed as follows:

$$R = \frac{\alpha \cdot r + \beta \cdot g + \gamma \cdot b}{r + g + b + d} \qquad (1)$$

where r, g, and b are red, green, and blue component pixel values of input image 12, respectively, α, β and γ are weighting factors, and d is a prescribed constant with a value selected to avoid singularities and to give higher weights to bright pixels. In one exemplary implementation in which each of r, g, and b have values in the range of [0,255], α=255, β=γ=0, and d has a value of 8. As shown in FIGS. 4A and 4B, based on the mapping of equation (1), global screening module 14 maps the redness of each pixel of an input image 12 to a corresponding pixel of a redness map 22 having a redness value given by equation (1).

Other representative redness measures (R1, R2, R3, R4) that may be used to compute redness map 22 are expressed in equations (2)–(5) below:

$$R1 = \frac{r^2}{(r + g + b + 1)^2} \qquad (2)$$

$$R2 = \frac{r^2}{(g + b)^2} \qquad (3)$$

$$R3 = \frac{r+b}{(r+g+b+1)} \quad (4)$$

$$R4 = \frac{Cr}{(Cb+1)^2} \quad (5)$$

where r, g, and b are red, green, and blue component pixel values of input image 12, respectively, and Cr and Cb are the red and blue chrominance component pixel values of the input image 12 in the YCbCr color space.

Figure 5A:
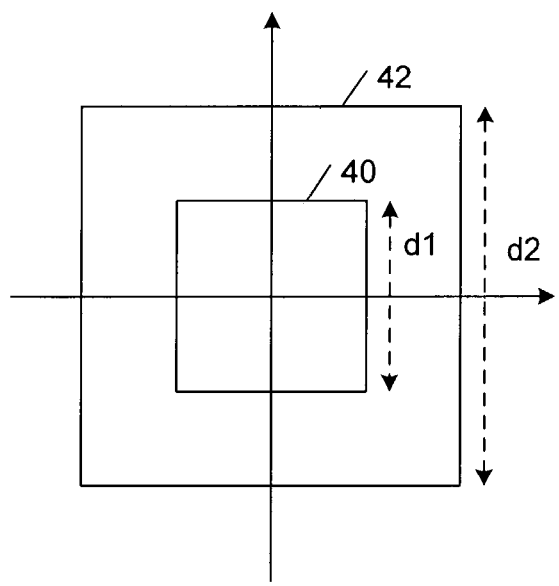
FIG. 5A is a diagrammatic view of a two-dimensional redness filter that includes a kernel pixel area and a surrounding pixel area.
Figure 5B:
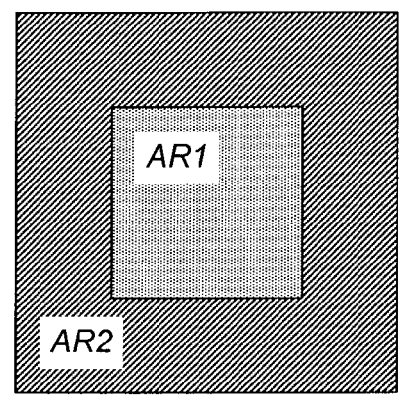
FIG. 5B is a diagrammatic view of the two-dimensional redness filter of FIG. 5A with the kernel pixel area labeled AR1 and the surrounding pixel area labeled AR2.

Referring back to FIG. 3 and to FIGS. 5A and 5B, global screening module 14 identifies a preliminary set of candidate red-eye pixels in the redness map 22 (step 38; FIG. 3). In some implementations, the preliminary set of candidate red-eye pixels is identified by applying a two-dimensional redness filter to the redness map 22. In one exemplary implementation, the following two-dimensional redness finite impulse response (FIR) filter is applied to the pixel redness measures of the redness map 22:

$$f(x, y) = \begin{cases} 1 & \text{if } (|x| < d1) \text{ and } (|y| < d1) \\ -1 & \text{otherwise} \end{cases} \quad (6)$$

The two-dimensional redness filter is defined with respect to a central kernel pixel area and a pixel area surrounding the kernel pixel area. As shown in FIGS. 5A and 5B, the particular FIR filter implementation of equation (6) is defined with respect to a square kernel area 40 (AR1) of side length d1 and a surrounding pixel area 42 (AR2) corresponding to a rectangular path defined between a square pixel area of side length d2 and the central kernel pixel area 40, where d1<d2 (e.g., d2=2·d1). In some implementations, the average values of the pixels within with kernel area AR1 and the surrounding area AR2 may be computed using integral image processing, where an integral image S(x, y) for an input image I(x, y) is defined as:

$$S(x, y) = \sum_{i=0}^{x} \sum_{j=0}^{y} I(i, j) \quad (7)$$

Given the integral image S, the sum of image pixels within an arbitrary rectangle (x1, x2] and (y1, y2] can be obtained by:

$$\text{Sum}(x1, x2, y1, y2) = S(x2, y2) - S(x2, y1) - S(x1, y1) \quad (8)$$

Based on equation (8), the average value of the pixels within an arbitrary rectangle can be obtained efficiently with three integer additions/subtractions and one division. In the above-described implementation, the average pixel values $APV_{R1}$ and $APV_{R2}$ over areas AR1 and AR2, respectively, are computed and the two-dimensional FIR of equation (6) is applied to the redness map 22 to generate the following redness score (RS1) for each corresponding region of the redness map:

$$RS1 = AR1 - AR2 \quad (9)$$

In another implementation, a nonlinear FIR filter is applied to the redness map 22 to generate the following redness score (RS2) for each corresponding region of the redness map:

$$RS2 = APV_{R1} + w \cdot \left(\frac{APV_{R1}}{APV_{R2}}\right)^4 \quad (10)$$

where w is a constant weighting factor, which may be determined empirically. In this equation, $APV_{R1}$ represents the absolute redness of the central kernel square AR1, and ($APV_{R1}/APV_{R2}$) represents the contrast between the central square AR1 and the surrounding area AR2. The redness score RS2 of equation (9) formulates how a red dot region must be sufficiently red while also exhibiting high contrast against its surrounding regions. In the above-described implementations, red-eye areas are approximated by square candidate pixel areas. In other embodiments, red-eye areas may be approximated by different shapes (e.g., circles or ellipses).

Figure 6:
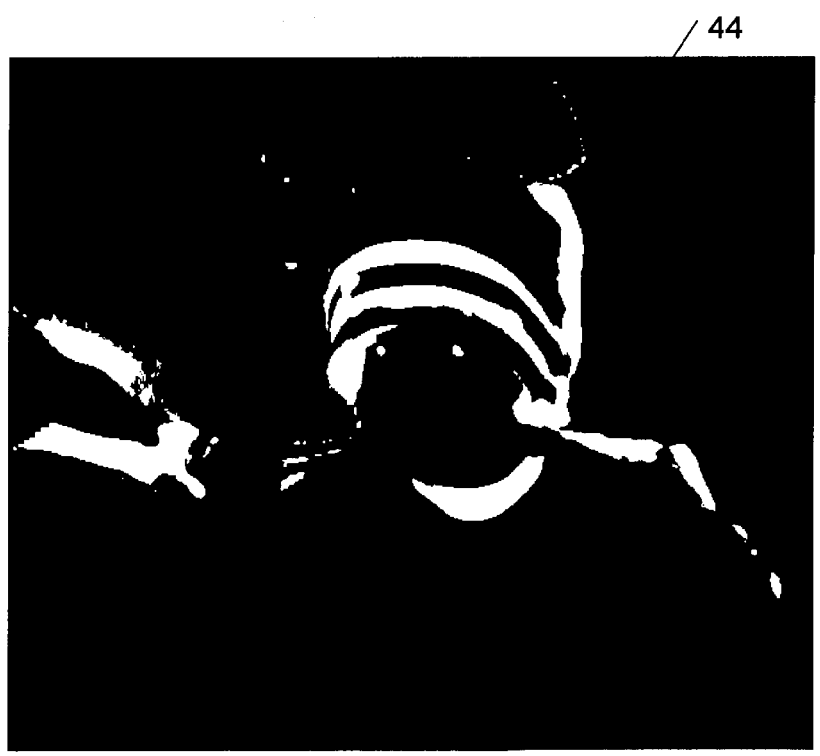
FIG. 6 is a candidate red-eye pixel map derived from the redness map of FIG. 4B.

Referring to FIG. 6, after a set of redness scores has been computed for a selected kernel size d1, an empirically determined threshold is applied to the computed redness scores to generate a binary map identifying candidate red-eye pixels. In one implementation, "0's" (black pixels) in the binary map represent background pixels and "1's" (white pixels) represent candidate red-eye pixels. Multiple binary maps are generated by repeating the process of computing redness scores and thresholding for different kernel sizes. The resulting binary maps are combined by applying the OR logical operator across all binary maps at each pixel location to create a final binary map 44 identifying candidate red-eye pixels. The candidate red-eye pixels in the final binary map 44 are segmented based on pixel connectivity, and each segmented region is labeled as a candidate redeye area. In one implementation, each candidate red-eye area is represented by a boundary rectangle (or box).

In some embodiments, a number of fast heuristics are applied to the candidate red-eye areas in the final binary map 44 to eliminate false alarms. Known red-eye pixel techniques may be used to eliminate false alarms, including aspect ratio inspection and shape analysis techniques. For example, in some implementations, elongated candidate red-eye areas are removed from the candidate list.

Global Candidate Red-Eye Pixel Area Verification

Referring to FIGS. 7, 8A, and 8B, global screening module 14 applies verification tests to each candidate red-eye area to ensure that it is red enough itself and more red than its surroundings. These verification tests are applied to candidate red-eye areas; they are not applied to individual pixels. In some embodiments, candidate red-eye pixel areas are filtered from the preliminary set of red-eye candidate areas based on redness contrast thresholds (step 46; FIG. 7). In these embodiments, a conventional greedy search process initially is applied to each preliminary candidate red-eye area 48 to maximize the size of the red-eye candidate area (e.g., a rectangle) under the condition that the average redness of the pixels within the new red-eye pixel area does not decrease. Since the preliminary red-eye pixels areas identified by the matched filtering process described above oftentimes are smaller than the actual red-eye in input image 12, the greedy search process increases the likelihood that the enlarged candidate red-eye area 50 covers a redeye in the input image 12 (if any). Next, the average redness of each candidate red-eye area 50 is compared with those of its eight neighboring boxes 51, each of which has the same size as the corresponding candidate red-eye area 50 (see FIG. 8B). If the minimal pair-wise contrast between a given candidate red-eye area 50 and the surrounding boxes is below a threshold, the given candidate red-eye area is removed from the preliminary red-eye candidate map. Contrast values are computed based on the difference between the average redness of the pixels of the candidate red-eye area (CenterAverage) and the average redness of the pixels of each of the neighboring area (NeighborAverage[k], where k=1, 2, ..., 8). If the following condition is satisfied, the candidate red-eye pixel area is removed from the preliminary candidate red-eye pixel map 24:

$$\text{MIN}(\text{CenterAverage}-\text{NeighborAverage}[k]) < C\text{MIN} \quad (11)$$

where k=1, 2, ..., 8, MIN is a function that computes the minimum of the computed contrast measures, and CMIN is an empirically determined minimum redness contrast threshold. If the condition of equation (10) is not satisfied, the candidate red-eye area under test is sent for further verification.

Referring to FIGS. 7, 9A, 9B, and 10, in some embodiments, global screening module 14 filters the candidate red-eye pixels areas remaining after the above-described redness verification process from the preliminary candidate red-eye area map 24 based on grayscale contrast thresholds (step 52; FIG. 7). In this process, a candidate red-eye pixel area is filtered based on whether it is darker than surrounding areas. Initially, grayscale map 26 (FIG. 2) is computed by mapping the pixels of input image 12 in accordance with a grayscale mapping G, given by G=MIN(G1, G2), where MIN is a function that outputs the minimum of G1 and G2, which are given by:

$$G1=0.299 \times r+0.587 \times g+0.114 \times b \quad (12)$$

$$G2=0.299 \times (255-r)+0.587 \times g+0.114 \times b \quad (13)$$

where r, g and b are red, green and blue values for each pixel within the region and the grayscale values are obtained for each pixel and averaged over the region. In this grayscale mapping, G1 is a conventional grayscale mapping computed from (r, g, b), whereas G2 is the grayscale mapping computed from (255-r, g, b). The grayscale mapping G2 handles instances of "glowing" red-eyes (i.e., when a red-eye are appears much brighter than its surroundings). In accordance with the above approach, such atypical "glowing" red-eyes are mapped to a grayscale channel that allows them to be treated in the same way as typical red-eyes.

Conventional search techniques are performed over the computed grayscale map 26 to locate one or more areas corresponding to eyeballs. In the illustrated embodiment, an eyeball area is represented as a square. In this embodiment, each red-eye candidate area remaining after the above-described redness verification process is assumed to correspond to a respective pupil area 50, which has a size that is equal to or smaller than the corresponding eyeball area 56 (shown as a square in FIG. 9A). Note that each pupil area 50 is not necessarily identical to its associated grayscale eyeball area 56. In this search algorithm design, it is assumed that the eyeball area 56 shares the same center with the pupil area 50. The size of the eyeball area 56 is determined based on a comparison of a candidate square box 58 with each of its eight nearest neighbors (numbers 0–7 in FIG. 9B). In particular, an initial area that encompasses the surrounding areas 0–7 is partitioned into nine equal sized boxes (numbered 0–8). The size of the final optimal grayscale box 56 (or square) is determined by selecting a size that maximizes the grayscale contrast between the center box 58 (box 8) and its surrounding neighbors (boxes 0–7). In this search only one variable is involved: the side length of the center box 58. In one implementation, a brute force search technique is used to determine the final size of eyeball area 56.

Figure 10:
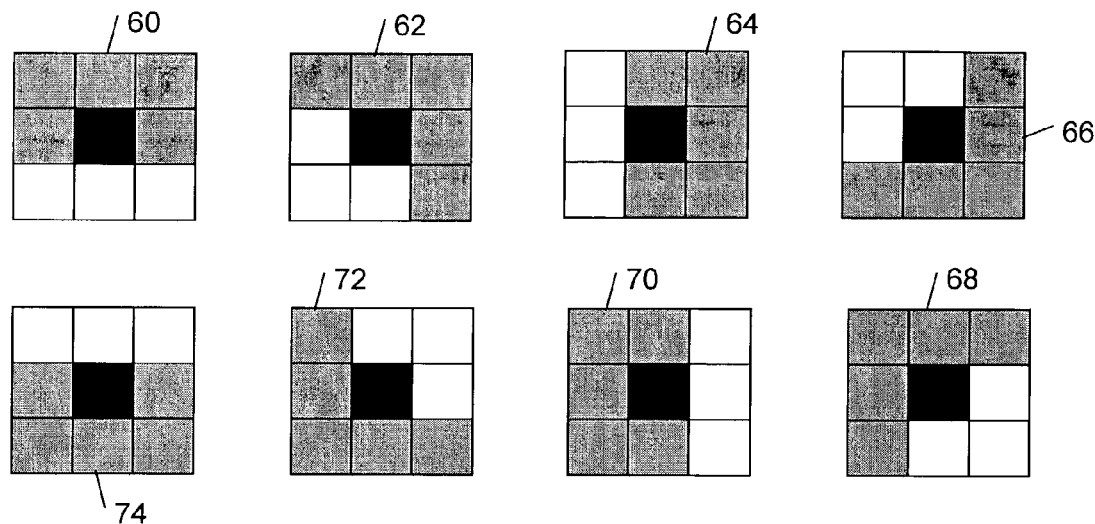
FIG. 10 illustrates different diagrammatic views of a candidate grayscale eyeball pixel area with various subsets of five neighboring pixel areas highlighted gray.

Once the final size of the grayscale eyeball area (or box) is determined, the grayscale contrast between the final eyeball area 56 and the surrounding boxes (0–7) are used to verify that the eyeball area corresponds to an actual eyeball in the input image 12. As illustrated in FIG. 10, the area surrounding a candidate eyeball area 56 is partitioned into eight equal sized boxes. The average grayscale of surrounding box k is denoted as N(k), k=0, 1, ..., 8 (where N[8] corresponds to the center eyeball box). Each of the circular subsets 60, 62, 64, 66, 68, 70, 72, 74, which consist of a respective set of five consecutive neighboring boxes, may be denoted by:

$$\{N(k \% 8), N((k+1)\%8), \ldots, N((k+4)\%8)\} \quad (14)$$

where % is the modulo operator and k=0, 1, ..., 7. This enables situations in which a redeye is located at the edge of a face in the input image 12 to be handled. Out of the eight subsets of surrounding boxes, the most uniform subset 60–74 is selected as the basis for computing a measure of grayscale contrast (CGRAY) with the central candidate box. That is:

$$CGRAY=AVER\{N(m\%8), N((m+1)\%8), \ldots, N((m+4)\%8)\}/N(8) \quad (15)$$

where m=argmin STD $\{N (k \%8), N((k+1)\%8), \ldots, N((k+4)\%8)\}$, k=0, 1, ..., 7, AVER$\{a(1), a(2), \ldots, a(n)\}$ represents the average of array $\{a(k)\}$, and STD$\{a(1), a(2), \ldots, a(n)\}$ represents the standard deviation of array $\{a(k)\}$. Based on the grayscale contrast computation of equation (15), candidate red-eye areas with corresponding candidate eyeball areas with a computed contrast measure below an empirically determined threshold are removed from the candidate red-eye pixel area map 24.

III. Local Verification Module

Referring back to FIG. 2, after the above-described global redness and grayscale verification processes have been applied, the candidate red-eye pixel area map 24 contains a set of candidate red-eye pixel areas each of which is likely to correspond to the approximate location and size of a red-eye area in input image 12. In some embodiments, local verification module 16 applies one or more local verification processes 28 to the candidate red-eye pixel area map 24 to further filter candidate red-eye pixel areas from the candidate red-eye pixel area map 24. In the following embodiments, skin tone classification, redness classification, and non-redness classification techniques are applied to localized areas of the input image 12 to verify candidates in the candidate red-eye pixel area map 24. These classification techniques are modeled based at least in part on the observation that a typical red-eye is a red region (i.e., the iris), surrounded by a non-red region (i.e., the white areas of the eye), and further surrounded mostly by a skin tone region (i.e., the face).

Skin Tone Verification

Candidates may be filtered from the candidate red-eye pixel area map 24 based on a skin tone verification process modeled at least in part on the observation that a redeye is a non skin tone region (i.e., the eye) surrounded by a skin tone region (i.e., the face). In this process, pixels in the input image 12 are classified as corresponding to either a skin tone area or a non-skin tone area. Any skin tone classification technique may be used to classify pixels of input image 12. After input image pixels have been classified, the pixels are segmented into skin tone regions and non-skin-tone regions using any pixel segmentation process.

In some implementations, each candidate in the red-eye candidate red-eye pixel area map 24 that does not correspond to an isolated non-skin-tone region (i.e., an island) within a skin tone region is filtered from the candidate red-eye pixel area map 24.

In some of implementations, in addition to the prior skin tone verification test, the proportion of skin tone pixels and non-skin-tone pixels in each candidate red-eye pixel area and the corresponding surrounding areas are determined, respectively. Each candidate that does not consist mostly of non-skin-tone pixels and is not surrounded by areas consisting mostly of skin tone pixels is filtered from the red-eye candidate red-eye pixel area map 24. The threshold proportions of non-skin-tone pixels in a target red-eye pixel area and skin tone pixels in target pixel areas surrounding a red-eye pixel area may be determined empirically.

Redness Verification

Candidates also may be filtered from the candidate red-eye pixel area map 24 based on a pixel-based or region-based redness verification process.

In a pixel-based redness verification process, pixels in input image 12 having color components satisfying the following criteria are classified as red pixels:

$Cr>128$, $Cr>Cb$, and $Cr>Y$,                                                           (16)

where Cr, Cb and Y are the color components of the input image pixels represented in the YCbCr color space.

In a region-based redness verification process, pixels in input image 12 having color components satisfying the following criteria are classified as red pixels:

$Cr>MeanCr+(12.0-MeanCr)\cdot(MaxCr-MinCr)/800$, $Cr>Cb$, and $Cr>Y+(MaxY-MinY)\cdot(MeanY-MinY)/(3\cdot255)$,              (17)

where MeanCr is the average value of Cr, MaxCr and MinCr are the maximum and minimum of Cr, MeanY is the average value of Y, MaxY and MinY are the maximum and minimum of Y. Each of these parameters is computed over a local window that corresponds to a region that is centered with respect to a given candidate red-eye pixel area and covers the entire eye with sufficient skin pixels.

Non-Redness Verification

Candidates also may be filtered from the candidate red-eye pixel area map 24 based on the contrast between a red-eye pixel area candidate and the non-redness of the surrounding eye white region. In these implementations, the YCbCr color component ratio Cb/Cr is computed over a local window area of input image 12. The local window corresponds to a region that is centered with respect to a given candidate red-eye pixel area and covers the entire eye. The Cb/Cr ratio values are inverted and thresholded to obtain a redness classification map. In some embodiments, the Cb/Cr ratio values are normalized based on the high and low extremes in the local window. The threshold level may be determined empirically and corresponds to a level that produces a white island surrounded by a dark region in the redness classification map. For example, FIG. 11B shows the result of performing non-redness/redness detection in a region encompassing the right eye of the boy appearing in the input image 12 of FIG. 1A.

Figures 12A, 12B, 12C, 13:
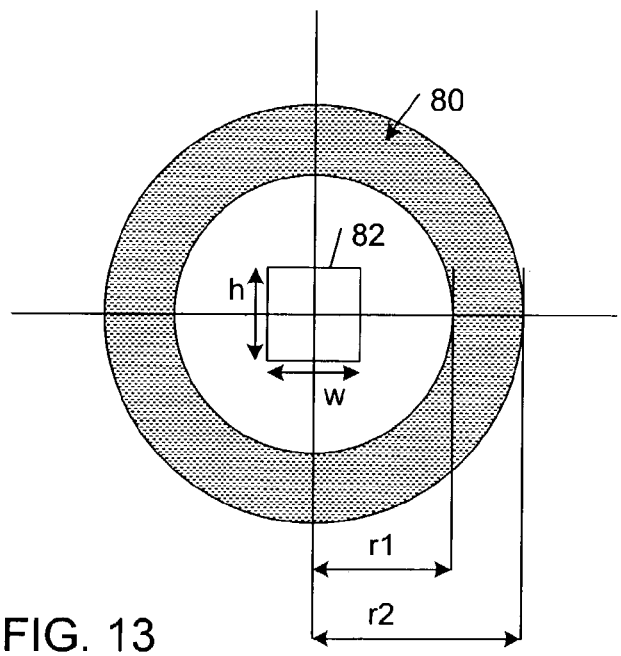
FIG. 12A is a diagrammatic view of a binary image of a detected red-eye pixel area.
FIG. 12B is a diagrammatic view of the binary image of FIG. 11A after red-eye pixels that are connected to image boundaries are removed.
FIG. 12C is a diagrammatic view of the binary image of FIG. 11B after pixels that are connected to a central region of the image are marked as red-eye pixels.
FIG. 13 is a diagrammatic view of two concentric circles illustrating a geometry used in an embodiment of a red-eye candidate pairing process.

Referring to FIGS. 12A, 12B, and 12C, in some embodiments, the redness classification map is processed to produce a redeye region in the form of an island (i.e., a region that is isolated from the boundary of the window but connected to the proximity of the center of the cropped window). FIG. 12A shows an exemplary initial state of the binary redness classification map that is produced after thresholding, where "1's" correspond to pixels classified as red pixels and "0's" correspond to pixels classified as non-red pixels. As shown in FIG. 12B, pixels in the initial binary redness map of FIG. 12A that are connected to the boundaries (i.e., the edges of the local window) are reclassified as non-red pixels. As shown in FIG. 12C, pixels that are connected to the proximity of the center of the window are marked as red-eye pixels (with a "2" in the illustrated example) in a final state of the redness classification map.

Pairing Verification

Referring back to FIG. 2, after the above-described global redness, global grayscale, and local verification processes have been applied, the candidate red-eye pixel area map 24 contains a set of candidate red-eye pixel areas each of which is likely to correspond to the approximate location and size of a red-eye area in input image 12. In some embodiments, local verification module 16 applies a local pairing verification process 30 to the candidate red-eye pixel area map 24 to further filter candidate red-eye pixel areas from the candidate red-eye pixel area map 24. In these embodiments, candidate red-eye pixel areas are grouped into pairs. This process reduces the number of false alarms and ensures that only paired red-eyes are corrected to avoid any unnatural appearance that might result from the correction of only one of a pair of eyes of a person appearing in input image 12. Pseudo-code corresponding to steps of one exemplary implementation of this pairing local verification process is provided below:

```
1.  For each redeye candidate (b1) {
2.    If its red box has not been paired with any other box {
3.      Search in the neighborhood of this red box for other
        red boxes
4.      For each redeye candidate (b2) whose red box totally
        inside the neighborhood {
5.        if boxes of (b1) and (b2) have similar size {
6.          mark (b1) and (b2) as paired
7.        }
8.      }
9.    }
10. }
11. For each redeye candidate (b) {
12.   If (b) is not paired {
13.     remove (b) from the candidate list
14.   }
15. }
```

For each current redeye candidate in above-described process, its pairing candidate is detected by searching for other candidate red-eye pixel areas in the candidate red-eye pixel area map in neighboring areas that are located within a fixed distance range with respect to the current candidate (step 3). Referring to FIG. 13, in some implementations, the neighboring search area 80 with respect to a candidate red-eye area 82 is illustrated as a hatched circular region, which is defined by two concentric circles. These two circles are centered with respect to a candidate red-eye area 82 under test. The radii (r1, r2) of the concentric circles may be determined based on the size of the current red box. For example, in some implementations, if the height and the width of the current candidate red-eye area 82 is h and w, the radii (r1, r2) of the concentric circles are set to:

$$r1=(h+w)\times 1.5 \quad (18)$$

$$r2=(h+w)\times 6.5 \quad (19)$$

In some embodiments, paired candidate red-eye pixel areas also are required to be similar in size. For example, in the pseudo code implementation of the pairing local verification process described above (step 5), the size of two candidate red-eye pixel areas are compared to make sure that they are similar enough. For example, in some embodiments, if the candidate red-eye pixel areas being paired are squares of lengths s1 and s2, respectively, and s1≦s2, then the two candidate red-eye pixel areas are labeled as pairs if the ratio s2/s1 is less than a prescribed mismatch threshold. In one exemplary implementation, the mismatch threshold is set to a value of 2.6.

IV. Semi-Automatic Local Verification

In some embodiments, the above-described local verification processes may be applied in a manual mode in which a user is expected to click on each redeye in input image 12. Pseudo-code corresponding to steps of one exemplary implementation of this manual local verification process is provided below:

1. Read Input Image; Get cursor position
2. Perform Skin Tone Pixel Classification at location of cursor (and its close neighbors); If clicked on skin tone area, ABORT
3. Perform Red Pixel Classification at location of cursor (and its close neighbors); If clicked on non red pixel, ABORT
4. Perform Red Region Classification at location of cursor (and its close neighbors); If clicked on non red area, ABORT
5. Set initial window size
6. Crop input image according to the window size
7. If Cursor (or any one of its close neighbors) is on an isolated, non-skin-tone region, then
    8. Perform YCbCr conversion, Normalize Cb/Cr locally, Invert Cb/Cr, Threshold (e.g., top 10%)
    9. If there is an island, then
        10. Lower threshold to grow the island
        11. Verify the shape (no off-shoot), DONE
    12. Else (no island)
        13. If cursor on white (threshold possibly too low), then
            14. Raise threshold until an island appears
            15. If never appears, ABORT
            16. Else verify the shape (no off-shoot), DONE
        17. Else, ABORT
18. Else
    19. If cursor (or any one of its close neighbors) is on an isolated, red region, then GOTO 8
    20. Else
        21. If window already covers the entire image, ABORT
        22. Else enlarge the window size, GOTO 6

The initial window size (step 5) may correspond to a preset window size (e.g., a square region with a size of 4 pixels by four pixels) or it may correspond to the candidate red-eye pixel area computed by the global screening module 14.

In some embodiments, the above-described manual local verification process is applied to a redeye reduction system that is based on human face detection. In these embodiments, each eye that is found by face detection in all the faces in an input image is processed in accordance with the above-described local verification process to determine if it is a redeye.

V. Red-Eye Segmentation Module

Referring to FIGS. 14, 15A, 15B, 15C, and 15D, after the global screening and local verification processes have been performed on an input image 12 containing a red-eye area 81 (FIG. 15A), the remaining candidates in the candidate red-eye pixel area map 24 may be segmented and corrected as follows.

Figure 14:
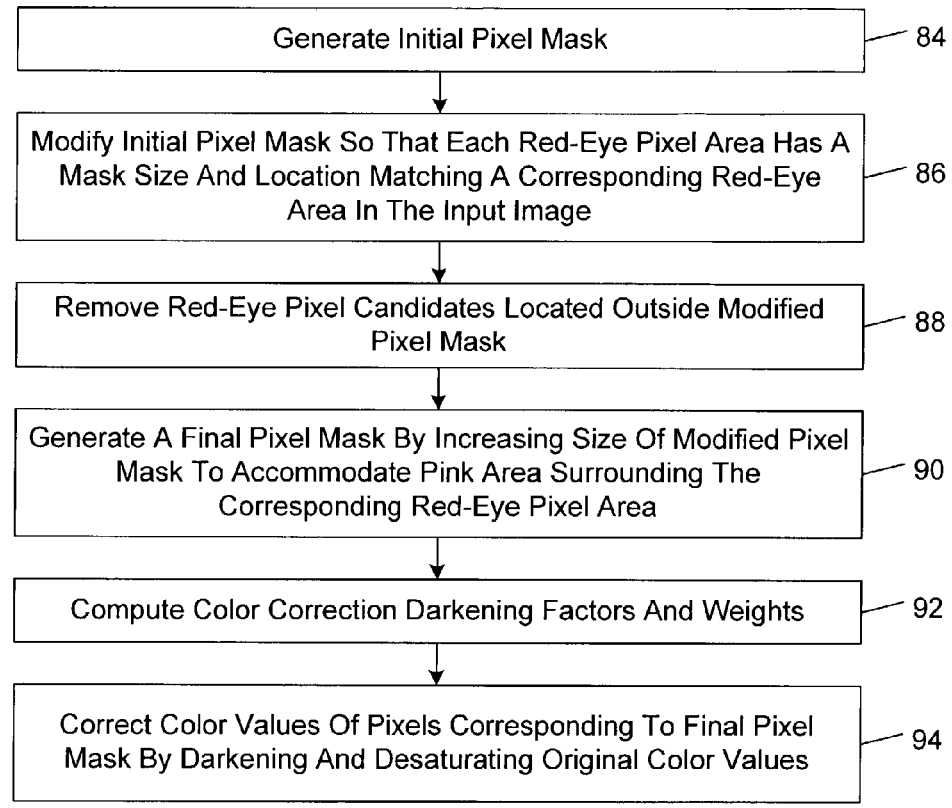
FIG. 14 is a flow diagram of a method of segmenting and correcting red-eye pixels in a digital image.

An initial pixel mask 83 (FIG. 15B) is generated based on the candidate red-eye pixel areas identified in the candidate red-eye pixel area map 24 (step 84; FIG. 14). In some embodiments, the initial pixel mask 83 is generated by selecting all pixels within the candidate red-eye pixels areas that are classified as red and non-skin-tone using one of the above-described local redness verification processes. In other embodiments, the final state of the redness classification map (see, e.g., FIG. 12C) is selected as the initial pixel mask 83.

The initial pixel mask 83 is modified so that each red-eye pixel area has a mask size and a location matching a corresponding red-eye area in the input image 12 (step 86; FIG. 14). In some embodiments, the mask sizes and locations over each red-eye pixel area may be determined using the procedure described in U.S. Pat. No. 6,016,354, which is incorporated herein by reference. For example, in these embodiments, each initial pixel mask may be modified by finding the maximum likelihood estimate of a binary square given the initial pixel mask over a red-eye pixel area. In particular, the following function (D) is maximized over all pixels in the initial pixel mask and all values of h, where h is the side length of the binary square:

$$D=2\cdot(number\_of\_candidates)-h^2 \quad (19)$$

After the sizes and locations of the binary squares have been computed for each red-eye pixel area, all red-eye pixels outside of the binary squares are removed as outliers to obtain a modified pixel mask (step 88; FIG. 14).

A final pixel mask 89 (FIG. 15C) is generated by growing (if necessary) each red-eye pixel area of the modified pixel mask to encompass any pink boundaries around the red-eye pixel areas (step 90; FIG. 14). In one implementation in which the original pixel values are represented in RGB color space, the modified pixel mask areas are grown based on the following pixel statistics. The red and green color components for all candidate red-eye pixels identified in the modified pixel mask are collected and the median red value ($R_{median}$) and green value ($G_{red\_median}$) of the red-eye pixel corresponding to the median red value. The following difference is computed:

$$\Delta_m = R_{median} - G_{red\_median} \quad (20)$$

If $\Delta_m$ is not greater than zero, the selected median red pixel is not a red pixel and, therefore, no pixels in the modified pixel mask are changed. Otherwise, for each mask pixel, the number of neighbors that are red-eye candidate pixels are determined. If a given mask pixel is not a candidate red-eye pixel, the following mask location setting process is executed:

```
If number of re-eye pixel neighbors > 2 {
    Δ = red – green;
    if (Δ > 0) {

P = |Δ – Δ_m| / Δ_m  * 100

RP = |red – R_median| / R_median  * 100 if (P < 40 and RP < 30), set mask location to 1 (to make it a
        candidate)
    }
}
``` wherein red and green are the red and green color component values of a given mask pixel. An updated mask is produced at the end of the process. The process is repeated a number of times until a predefined growth range (e.g., 5 pixels) has been achieved to obtain final pixel mask 89.

Additional details regarding the process of segmenting red-eye pixels may be obtained from U.S. Pat. No. 6,016,354.

VI. Red-Eye Correction Module

Figure 16:
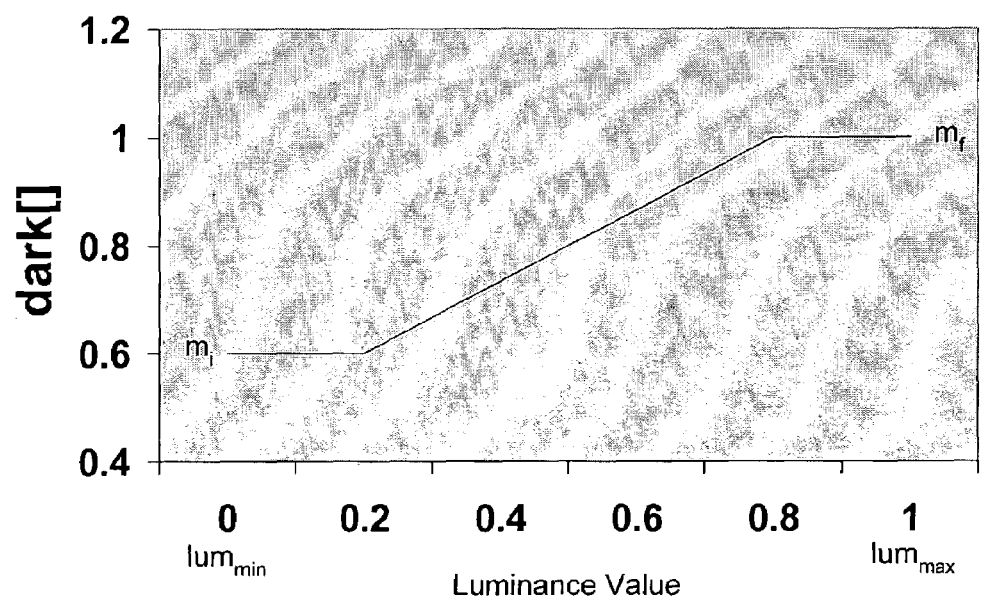
FIG. 16 is a graph of darkening factors plotted as a function of a green color component value of a pixel of an input image.

Referring to FIGS. 14 and 16, after the final pixel mask 89 identifying red-eye pixels to be corrected has been computed (step 90; FIG. 14), color correction darkening factors and weights are computed (step 92; FIG. 14). The darkening factors and weights indicate how strongly original color values of red-eye pixels are to be desaturated (i.e., pushed towards neutral or gray values). As explained in detail below, these two factors vary with pixel location in the final pixel mask to give a smooth transition between the pixels in the input image 12 that are changed and those that are not to avoid artifacts.

The darkening factors are computed based on luminance (or gray) values of the input image pixels. In one implementation, the darkening factors are computed based on the graph shown in FIG. 16, where the luminance (or gray) level of each red-eye pixel is assumed to vary over a range of $[lum_{min}, lum_{max}]=[0, 1]$. In one implementation, the green color channel is used to estimate luminance values. Other implementations may use different estimates or measures of luminance values. In the illustrated implementation, the minimum darkening factor ($m_i$) is set to 0.6 and the maximum darkening factor ($m_f$) is set to 1.0. These parameters may be set to different values in other implementations. In this formulation, the darkening factor values decrease with the darkness levels of the pixels. That is, lower (i.e., darker) luminance (or gray) values are associated with lower darkness factors. Since the darkness factors influence pixel values in a multiplicative way in the implementation described below, darker pixels (i.e., pixels with lower luminance values) identified as red in the final pixel mask are darkened more than lighter pixels (i.e., pixels with higher luminance values).

The weights (wt) are set for a given pixel based on the number of red-eye candidate pixels in the final pixel mask that neighbor the given pixel. For example, in one implementation, the weights may be set as follows:

$$wt = \begin{cases} 0 & \text{candidate neighbors} = 0 \\ .33 & \text{candidate neighbors} = 1, 2, 3 \\ .67 & \text{candidate neighbors} = 4, 5, 6 \\ 1 & \text{candidate neighbors} = 7, 8 \end{cases} \quad (21)$$

where candidate neighbors corresponds to the number of candidate red-eye pixels in the final pixel mask that neighbor the given pixel being assigned a weighting factor. In this formulation, candidate red-eye pixels near the center of the red-eye pixel area identified in the final pixel mask are assigned higher weights than red-eye pixels near the boundaries of the red-eye pixel area.

Color values of pixels corresponding to the final pixel mask 89 are corrected by desaturating and darkening original color values in accordance with the computed darkening and weight factors (step 94; FIG. 14). In some RGB color space implementations, the color values (red, green, blue) of each input image pixel identified as red in the final pixel mask are corrected to the final color values $(R_1, G_1, B_1)$ as follows:

If (mask=1), $tmp=dark[green-grn_{min}]$

Else tmp=1

Figure 15A:
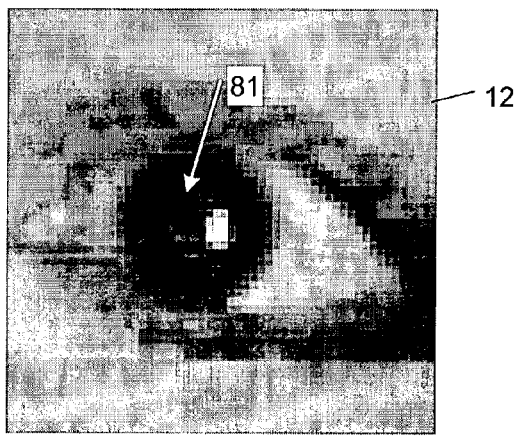
FIG. 15A is an input image of an eye containing a red-eye pixel area.
Figure 15B:
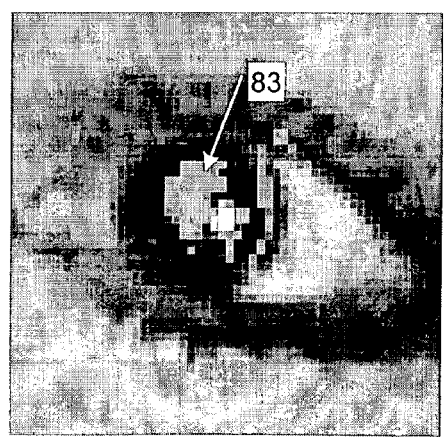
FIG. 15B is the input image of FIG. 15A with an initial pixel mask superimposed on the red-eye pixel area.
Figure 15C:
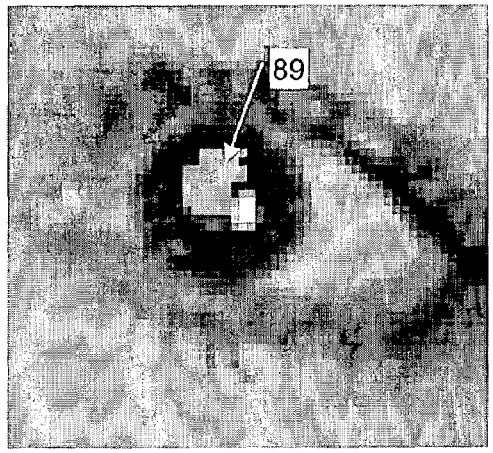
FIG. 15C is the input image of FIG. 15A with a final pixel mask superimposed on the red-eye pixel area.
Figure 15D:
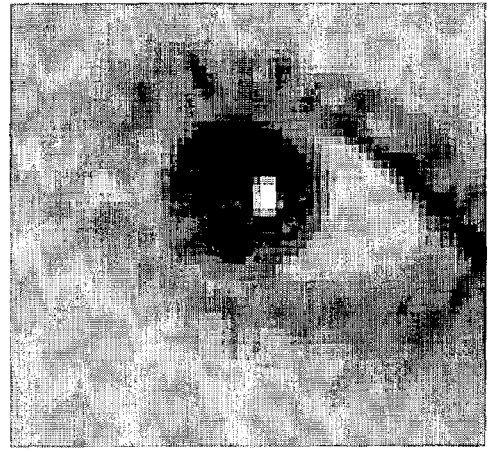
FIG. 15D is the input image of FIG. 15A with the red-eye pixel area corresponding to the final pixel mask of FIG. 15C corrected in accordance with the method of FIG. 14.

$R_1=(wt*tmp*green+(1-wt)*red)$ $G_1=(wt*tmp*green+(1-wt)*green)$ $B_1=(wt*tmp*green+(1-wt)*blue)$ In these embodiments, it is assumed that the color components of the input image pixels are defined with respect to the RGB color space. These embodiments readily may be extended to other color space representations. It is noted that if wt=1, pixel values are pushed all the way to neutral (i.e., the pixel values are set to the same shade of gray). If wt=0, none of the color component values of the corresponding pixel are changed. In this implementation, lower luminance pixels (i.e., smaller green values) generally are pushed darker than higher luminance pixels, which have their luminance unchanged. A red-eye corrected version of the region of input image 12 of FIG. 15A is shown in FIG. 15D.

VII. CONCLUSION

Other embodiments are within the scope of the claims.

The systems and methods described herein are not limited to any particular hardware or software configuration, but rather they may be implemented in any computing or processing environment, including in digital electronic circuitry or in computer hardware, firmware, device driver, or software. These systems and methods may be embedded in the hardware of any one of a wide variety of electronic devices, including digital cameras, printers, and portable electronic devices (e.g., mobile phones and personal digital assistants).

What is claimed is:

1. A method of processing a digital image containing pixels with original color values, comprising:

computing measures of pixel redness in the digital image;

identifying a preliminary set of candidate red-eye pixel areas based on the measures of pixel redness;

filtering from the preliminary set each candidate red-eye pixel area having a computed redness contrast relative to at least one respective neighboring pixel area less than a prescribed redness contrast threshold; and filtering from the preliminary set each candidate red-eye pixel area located in an area of the digital image having a computed grayscale contrast relative to at least one respective neighboring pixel area less than a prescribed grayscale contrast threshold.

2. The method of claim 1, wherein pixel redness measures are computed based on a ratio of a measure of a red component of pixel energy to a measure of total pixel energy.

3. The method of claim 2, wherein pixel redness measures (R) are computed based on the following ratio:

$$R = \frac{\alpha \cdot r + \beta \cdot g + \gamma \cdot b}{r + g + b + d}$$

where r, g, and b are red, green, and blue component pixel values of the digital image, respectively, $\alpha$, $\beta$ and $\gamma$ are weighting factors, and d is a prescribed constant.

4. The method of claim 1, wherein identifying the preliminary set of candidate red-eye pixel areas comprises applying a two-dimensional redness filter to the computed pixel redness measures, wherein the redness filter is operable to compute a redness score based on a central kernel pixel area and a pixel area surrounding the kernel pixel area.

5. The method of claim 4, wherein the kernel pixel area and the surrounding pixel area are concentric.

6. The method of claim 4, wherein the kernel pixel area corresponds to a square pixel area of side length d1 and the surrounding pixel area corresponds to a rectangular path defined between square pixel area of side length d2 and the central kernel pixel area, wherein d2<d2.

7. The method of claim 4, wherein the computed redness score includes a component measuring average redness of the kernel pixel area and a component measuring average contrast of the kernel pixel area relative to the surrounding pixel area.

8. The method of claim 4, wherein redness scores are computed for multiple different kernel pixel area sizes.

9. The method of claim 4, further comprising applying a prescribed threshold to the measures of pixel redness to identify candidate red-eye pixels.

10. The method of claim 9, wherein computing the preliminary set of candidate red-eye pixel areas comprises segmenting candidate red-eye pixels into groups.

11. The method of claim 10, further comprising computing a measure of average pixel redness for each segmented pixel group, and maximizing each segmented pixel group to a candidate red-eye pixel area having an average pixel redness measure at least as large as the average pixel redness measure computed for the segmented pixel group.

12. The method of claim 1, further comprising filtering candidate red-eye pixel areas from the preliminary set based on candidate red-eye pixel area shape.

13. The method of claim 1, wherein each candidate red-eye pixel area having a computed redness contrast relative to each of a set of corresponding surrounding pixel areas less than the prescribed redness contrast threshold is filtered from the preliminary set.

14. The method of claim 13, wherein each surrounding pixel area is equal in size to a corresponding candidate red-eye pixel area.

15. The method of claim 1, further comprising computing measures of pixel grayscale in the digital image and computing for a given candidate red-eye pixel area a candidate eyeball area centered at the given candidate red-eye pixel area and having a size maximizing grayscale contrast between the candidate eyeball area and areas surrounding the candidate eyeball area.

16. The method of claim 15, further comprising computing a measure of grayscale contrast between the candidate eyeball area and at least a portion of the areas surrounding the candidate eyeball area and applying a threshold to the measure of grayscale contrast to filter candidate red-eye pixel areas from the preliminary set.

17. The method of claim 1, further comprising pairing candidate red-eye pixel areas, and filtering unpaired candidate red-eye pixel areas from the preliminary set.

18. The method of claim 1, further comprising filtering from the preliminary set candidate red-eye pixel areas merged with adjacent skin tone regions in the digital image.

19. The method of claim 1, further comprising filtering candidate red-eye pixel areas from the preliminary set based on proportions of non-skin tone pixels in the candidate red-eye pixel areas and proportions of skin tone pixels in areas surrounding the candidate red-eye pixel areas.

20. The method of claim 1, further comprising mapping digital image pixels in candidate red-eye pixel areas into YCbCr color space, and applying thresholds to mapped YCbCr color space pixel values to filter candidate red-eye pixel areas.

21. The method of claim 1, further comprising computing a ratio of YCbCr color space chrominance components for each pixel in image areas respectively encompassing candidate red-eye pixels areas and applying a threshold to the computed ratios to identify candidate red-eye regions.

22. The method of claim 21, further comprising identifying in the candidate red-eye regions final red-eye pixel regions corresponding to isolated pixel islands.

23. The method of claim 1, further comprising correcting red-eye in the digital image.

24. The method of claim 23, wherein correcting red-eye comprises classifying pixels in each candidate red-eye pixel area based on redness and skin tone coloration and, for each candidate red-eye pixel area, generating an initial pixel mask identifying all pixels in the candidate red-eye pixel area classified as red and non-skin tone.

25. The method of claim 24, further comprising modifying an initial pixel mask to achieve a mask size and location matching a corresponding red-eye pixel area.

26. The method of claim 25, further comprising generating a final pixel mask by increasing the modified pixel mask in size to accommodate pink areas surrounding the corresponding red-eye pixel area.

27. The method of claim 26, further comprising correcting original color values of pixels corresponding to the final pixel mask by desaturating original color values.

28. The method of claim 27, wherein original color values identified as red in the final pixel mask are desaturated by respective amounts that vary with pixel location in the final pixel mask.

29. The method of claim 27, wherein original color values of a given pixel are desaturated based on a luminance level of the given pixel.

30. The method of claim 27, wherein original color values of a given pixel are desaturated based on a number of pixels in the final pixel mask neighboring the given pixel.

31. The method of claim 27, further comprising correcting original color values of pixels corresponding to the final pixel mask by darkening the original color values.

32. The method of claim 31, wherein original color values of a given pixel are darkened by an amount decreasing with a luminance level of the given pixel.

33. A method of processing a digital image containing pixels with original color values, comprising:
detecting a candidate red-eye pixel area in the digital image;
generating a final pixel mask identifying red-eye pixels and non-red-eye pixels in the candidate red-eye pixel area; and
desaturating pixels in the candidate red-eye pixel area identified as red-eye pixels in the final pixel mask from their original color values by respective scaling factors that vary depending on luminance of the identified red-eye pixels in the candidate red-eye pixel area and proximity of the identified red-eve pixels in the candidate red-eve pixel area to boundaries between red-eye pixels and non-red-eye pixels identified in the final pixel mask.

34. The method of claim 33, further comprising:
classifying pixels in the candidate red-eye pixel area as one of red and non-red;
classifying pixels in the candidate red-eye pixel area as one of skin tone and non-skin tone;
generating an initial pixel mask identifying all pixels in the candidate red-eye pixel area classified as red and non-skin tone; and
modifying the initial pixel mask to achieve a mask size and location matching the candidate red-eye pixel area.

35. The method of claim 34, further comprising generating the final pixel mask by increasing the modified pixel mask in size to accommodate pink areas surrounding the candidate red-eye pixel area.

36. The method of claim 33, wherein each red-eye pixel in the final pixel mask has a respective number of neighboring red-eye pixels, and the desaturating comprises desaturating pixels in the candidate red-eye pixel area identified as red-eye pixels in the final pixel mask from their original color values by respective scale factors that vary depending their respective numbers of neighboring red-eye pixels.

37. The method of claim 33, wherein original color values of a given pixel are darkened by an amount increasing with a darkness level of the given pixel.

38. A system for processing a digital image containing pixels with original color values, comprising a global screening module operable to:
compute measures of pixel redness in the digital image;
identify a preliminary set of candidate red-eye pixel areas based on the measures of pixel redness;
filter from the preliminary set each candidate red-eye pixel area having a computed redness contrast relative to at least one respective neighboring pixel area less than a prescribed redness contrast threshold; and
filter from the preliminary set each candidate red-eye pixel area located in an area of the digital image having a computed grayscale contrast relative to at least one respective neighboring pixel area less than a prescribed grayscale contrast threshold.

39. The system of claim 38, wherein pixel redness measures are computed based on a ratio of a measure of a red component of pixel energy to a measure of total pixel energy.

40. The system of claim 38, wherein identifying the preliminary set of candidate red-eye pixel areas comprises applying a two-dimensional redness filter to the computed pixel redness measures, wherein the redness filter is operable to compute a redness score based on a central kernel pixel area and a pixel area surrounding the kernel pixel area.

41. The system of claim 38, wherein the global screening module is operable to filter candidate red-eye pixel areas from the preliminary set based on candidate red-eye pixel area shape.

42. The system of claim 38, wherein each candidate red-eye pixel area having a computed redness contrast relative to each of a set of corresponding surrounding pixel areas less than the prescribed redness contrast threshold is filtered from the preliminary set.

43. The system of claim 38, wherein the global screening module is operable to compute measures of pixel grayscale in the digital image and computing for a given candidate red-eye pixel area a candidate eyeball area centered at the given candidate red-eye pixel area and having a size maximizing grayscale contrast between the candidate eyeball area and areas surrounding the candidate eyeball area.

44. The system of claim 38, further comprising a local verification module operable to pair candidate red-eye pixel areas and filter unpaired candidate red-eye pixel areas from the preliminary set.

45. The system of claim 38, further comprising a local verification module operable to filter from the preliminary set candidate red-eye pixel areas merged with adjacent skin tone regions in the digital image.

46. The system of claim 38, further comprising a local verification module operable to filter candidate red-eye pixel areas from the preliminary set based on proportions of non-skin tone pixels in the candidate red-eye pixel areas and proportions of skin tone pixels in areas surrounding the candidate red-eye pixel areas.

47. The system of claim 38, further comprising a local verification module operable to map digital image pixels in candidate red-eye pixel areas into YCbCr color space, and applying thresholds to mapped YCbCr color space pixel values to filter candidate red-eye pixel areas.

48. The system of claim 38, further comprising a local verification module operable to compute a ratio of YCbCr color space chrominance components for each pixel in image areas respectively encompassing candidate red-eye pixels areas and applying a threshold to the computed ratios to identify candidate red-eye regions.

49. The system of claim 48, wherein the local verification module is operable to identify in the candidate red-eye regions final red-eye pixel regions corresponding to isolated pixel islands.

50. The system of claim 38, further comprising a red-eye segmentation module operable to classify pixels in each candidate red-eye pixel area based on redness and skin tone coloration and, for each candidate red-eye pixel area, generate an initial pixel mask identifying all pixels in the candidate red-eye pixel area classified as red and non-skin tone.

51. The method of claim 50, wherein the red-eye segmentation module operable to modify an initial pixel mask to achieve a mask size and location matching a corresponding red-eye pixel area.

52. The method of claim 51, wherein the red-eye segmentation module operable to generate a final pixel mask by increasing the modified pixel mask in size to accommodate pink areas surrounding the corresponding red-eye pixel area.

53. The system of claim 38, further comprising a red-eye correction module operable to correct red-eye in the digital image.

54. The system of claim 53, wherein the red-eye correction module operable to correct original color values of pixels corresponding to the final pixel mask by desaturating original color values.

55. The system of claim 54, wherein original color values of a given pixel are desaturated based on a luminance level of the given pixel.

56. The system of claim 54, wherein original color values of pixels identified as red in the final pixel mask are desaturated by respective amounts that vary with pixel location in the final pixel mask.

57. The system of claim 54, wherein original color values of a given pixel are desaturated based on a number of pixels in the final pixel mask neighboring the given pixel.

58. The system of claim 54, wherein the red-eye correction module operable to correct original color values of pixels corresponding to the final pixel mask by darkening the original color values.

59. The system of claim 58, wherein original color values of a given pixel are darkened by an amount decreasing with a luminance level of the given pixel.

60. A system for processing a digital image containing pixels with original color values, comprising:
 a red-eye detection module operable to detect a candidate red-eye pixel area in the digital image;
 a red-eye segmentation module operable to generate a final pixel mask identifying red-eye pixels and non-red-eye pixels in the candidate red-eye pixel area; and
 a red-eye correction module operable to desaturate pixels in the candidate red-eye pixel area identified as red-eye pixels in the final pixel mask from their original color values by respective scaling factors that vary depending on luminance of the identified red-eye pixels in the candidate red-eye pixel area and proximity of the identified red-eye pixels in the candidate red-eye pixel area to boundaries between red-eye pixels and non-red-eye pixels identified in the final pixel mask.

\* \* \* \* \*

UNITED STATES PATENT AND TRADEMARK OFFICE
CERTIFICATE OF CORRECTION

PATENT NO.         : 7,116,820 B2                                   Page 1 of 1
APPLICATION NO. : 10/424419
DATED              : October 3, 2006
INVENTOR(S)        : Luo et al.

It is certified that error appears in the above-identified patent and that said Letters Patent is hereby corrected as shown below:

In column 5, line 55, delete "Sum(x1, x2, y1, y2)=S(x2, y2)-S(x2, y1)-S(x1, y1)" and insert -- Sum(x1, x2, y1, y2) = S(x2, y2)-S(x2, y1)-S(x1, y2)+S(x1, y1) --, therefor.

Figure 11A:
FIG. 11A is an exemplary input image of a boy.
Figure 11B:
FIG. 11B is an image produced by thresholding a redness classification map in a region encompassing the right eye of the boy appearing in FIG. 11A.

In column 10, line 5, delete "FIG. 1A." and insert -- FIG. 11A, --, therefor.

In column 15, line 32, in Claim 6, after "length" delete "dI" and insert -- d1 --, therefor.

In column 15, line 35, in Claim 6, delete "d2<d2." and insert -- d1<d2. --, therefor.

In column 17, line 16, in Claim 33, delete "red-eve" and insert -- red-eye --, therefor.

In column 17, line 17, in Claim 33, after "candidate" delete "red-eve" and insert -- red-eye --, therefor.

Signed and Sealed this

Twenty-second Day of December, 2009

David J. Kappos
*Director of the United States Patent and Trademark Office*